US008549825B2

(12) United States Patent
Takayama et al.

(10) Patent No.: US 8,549,825 B2
(45) Date of Patent: Oct. 8, 2013

(54) CASE PACKER

(75) Inventors: Motoki Takayama, Shiga (JP); Tatsuya Arimatsu, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 354 days.

(21) Appl. No.: 12/840,906

(22) Filed: Jul. 21, 2010

(65) Prior Publication Data

US 2011/0023422 A1 Feb. 3, 2011

Related U.S. Application Data

(60) Provisional application No. 61/229,128, filed on Jul. 28, 2009.

(51) Int. Cl.
*B65B 5/06* (2006.01)
*B65B 35/24* (2006.01)
*B65B 35/44* (2006.01)
*B65B 35/56* (2006.01)
*B65B 57/14* (2006.01)

(52) U.S. Cl.
USPC .......... 53/504; 53/531; 53/540; 73/49.3; 73/52; 198/418.9; 198/444; 198/502.2

(58) Field of Classification Search
CPC ...... B65B 57/16; B65B 57/14; B65B 35/243; B65B 5/064; B65B 5/061
USPC .......... 53/500, 504, 503, 155, 531, 540, 542, 53/544; 198/502.2, 644, 418.9, 444; 271/262; 73/49.3, 52, 824
IPC ............ B65B 5/06, 35/24, 35/44, 35/50, 35/56, B65B 57/14
See application file for complete search history.

(56) References Cited

U.S. PATENT DOCUMENTS

| | | | | |
|---|---|---|---|---|
| 4,649,740 A | * | 3/1987 | Franklin | 73/49.3 |
| 4,864,801 A | | 9/1989 | Fallas | |
| 5,279,099 A | * | 1/1994 | Goodman et al. | 73/49.3 |
| 5,507,134 A | * | 4/1996 | Takeda et al. | 53/531 |
| 5,542,288 A | * | 8/1996 | Fenlon | 73/49.3 |

(Continued)

FOREIGN PATENT DOCUMENTS

| | | | | |
|---|---|---|---|---|
| EP | 540148 A1 | * | 5/1993 | G01M 3/32 |
| EP | 806361 A1 | * | 11/1997 | B65B 57/14 |

(Continued)

OTHER PUBLICATIONS

Extended European Search Report of the corresponding European Application No. 10170311.4, dated Nov. 24, 2010, 5 pages.

*Primary Examiner* — Stephen F Gerrity
(74) *Attorney, Agent, or Firm* — Global IP Counselors, LLP

(57) ABSTRACT

A case packer is adapted to convey a plurality of packages and to pack the plurality of conveyed packages in a box. The case packer includes a first conveying unit, a detector, a second conveying unit and a control unit. The first conveying unit is configured and arranged to convey the packages. The detector is configured and arranged to detect a thickness of at least one of the packages. The second conveying unit includes an accumulating portion where the packages are accumulated with the packages being partially overlaid on one another. The second conveying unit is configured and arranged to convey the packages overlaid in the accumulating portion. The control unit is configured to adjust operation of the second conveying unit based on a detected value from the detector.

12 Claims, 13 Drawing Sheets

(56) References Cited

U.S. PATENT DOCUMENTS

| | | | |
|---|---|---|---|
| 5,622,025 A * | 4/1997 | Kitagawa et al. | 53/544 |
| 5,782,332 A * | 7/1998 | Guidetti et al. | 198/357 |
| 5,786,530 A * | 7/1998 | Fenlon | 73/49.3 |
| 5,881,532 A * | 3/1999 | Kitagawa | 53/54 |
| 6,474,141 B1 * | 11/2002 | Takaoka et al. | 73/49.3 |
| 6,568,247 B2 * | 5/2003 | Taylor | 73/49.3 |
| 6,622,848 B1 | 9/2003 | Lattimer et al. | |
| 6,941,796 B2 * | 9/2005 | Bennett | 73/49.3 |
| 7,455,171 B2 * | 11/2008 | Buechel | 198/502.2 |
| 7,698,877 B2 * | 4/2010 | Combrink | 53/467 |
| 2002/0043445 A1 * | 4/2002 | Yokota et al. | 53/544 |
| 2010/0115886 A1 * | 5/2010 | Takayama et al. | 53/147 |
| 2011/0232228 A1 * | 9/2011 | Iwasa et al. | 53/147 |

FOREIGN PATENT DOCUMENTS

| | | | |
|---|---|---|---|
| EP | 2072403 A1 | 6/2009 | |
| GB | 2259776 A * | 3/1993 | G01M 3/36 |
| JP | 10297614 A * | 11/1998 | B65B 35/44 |
| JP | 2000318831 A * | 11/2000 | B65B 5/06 |
| JP | 2008-68915 A | 3/2008 | |

* cited by examiner

CASE PACKER

CROSS-REFERENCE TO RELATED APPLICATIONS

This application claims priority to U.S. Provisional Application No. 61/229,128 filed on Jul. 28, 2009. The entire disclosure of U.S. Provisional Application No. 61/229,128 is hereby incorporated herein by reference.

BACKGROUND OF THE INVENTION

1. Field of the Invention

The present invention relates to a case packer for packing packages in boxes.

2. Description of the Background Art

Various case packers are conventionally used when packing packages in boxes. For example, Japanese Patent Application Laid-open No. 2008-68915 (hereinafter referred to as Patent Document 1) discloses a case packer that accumulates a plurality of individual bags as one group and packs the group of bags in a predetermined-size box, and the case packer solves a problem caused by uneven thicknesses of the bags.

The case packer disclosed in Patent Document 1 accumulates the plurality of individual bags as one group, and packs the group of the bags in the predetermined-size box. The case packer includes thickness-detecting means for detecting a thickness of each of the bags, determining means for determining whether or not it is appropriate to pack the group of bags in the predetermined-size box based on the thickness detected by the detecting means, and selecting means for selecting one of the bags that should be replaced by another bag when determined that it is not appropriate.

SUMMARY OF THE INVENTION

As described above, according to the case packer described in the patent document 1, it is possible to solve the problem caused by uneven thickness of the bag.

However, a thickness of a package is varied depending upon a size of its content, a climate condition, and a packaging condition or the like. Therefore, when packages are conveyed in a state where they are partially overlaid on one another, the thickness of the packages is varied. An overlaying amount of packages is increased or decreased as compared with its predetermined amount. Consequently, the position of the packages is varied. As a result, when the packages in inappropriate position are conveyed, the packages are flipped over or a problem occurs when packing the packages in boxes.

It is an object of the present invention to provide a case packer capable of partially overlaying packages on one another and stably conveying packages for packing the packages in boxes even when thickness of the package is varied.

(1) A case packer according to a first aspect of the invention is adapted to convey the plurality of packages, and to pack the plurality of conveyed packages in a box. The case packer includes a first conveying unit configured and arranged to the packages, a detector configured and arranged to detect a thickness of the package, a second conveying unit including an accumulating portion in which the packages are partially overlaid on one another, the second conveying unit being configured to convey the packages overlaid in the accumulating portion, and a control unit configured to adjust operation of the second conveying unit based on a detected value from the detector.

In the case packer of the first aspect, the detector detects the thicknesses of the packages, and the packages are conveyed by the first conveying unit. The second conveying unit which is provided with the accumulating portion conveys the packages that are overlaid in the accumulating portion. The control unit adjusts movement of the second conveying unit based on the thickness information of the package from the detector.

A detected value from the detector may directly be given to the control unit, or may be indirectly given to the control unit through other units such as a server or the like.

A bag of the package expands depending upon humidity, temperature, the packaging condition or the like. Therefore the thickness of the package is varied from moment to moment. Even if the thickness of the package is varied, the movement of the second conveying unit is adjusted by the control unit. Thereby, the packages can reliably be overlaid in the accumulating portion.

(2) It is preferable that the detector provides the control unit with thickness information of a plurality of the packages.

In this case, the detector can provide the control unit with thickness information of one or more packages. That is, thickness information of one package can be given to the control unit, or thickness information of the plurality of packages can be given to the control unit. The thicknesses of the plurality of packages may be statistical information of thickness such as an average value, or a deviation or the like.

(3) It is preferable that the detector includes a seal checker.

Since the detector includes the seal checker, it is unnecessary to newly provide a sensor. That is, it is possible to reduce the cost by using the seal checker that checks sealing performance of the packages.

A detected value from the seal checker may directly be given to the control unit, or may be indirectly given to the control unit through other units such as a server or the like.

(4) It is preferable that the control unit is configured to control operation of the second conveying unit based on thickness information of a plurality of the packages from the detector.

When the control unit controls the operation of the second conveying unit based on a thickness of one package, even when a thickness of a bag is abruptly varied, the packages can reliably be overlaid on one another in the accumulating portion.

Moreover, it is also possible to control the operation of the second conveying unit based on thicknesses of the plurality of packages. Therefore, even when thickness of a bag is gradually varied, it is possible to reliably overlay the packages in the accumulating portion.

(5) It is preferable that the control unit is configured to control the second conveying unit such that a group of a predetermined number of the packages is overlaid on one another as one group, and such that an overlaying amount of a package that is to be overlaid on at least last one of the packages in the group is adjusted.

In this case, it is possible to reduce the overlaying amount of a package that is to be overlaid on at least last one of the packages. As a result, even when the overlaid packages are conveyed by the second conveying unit, it is possible to prevent position of the overlaid packages from being disturbed. Control may be performed such that the overlaying amount of other packages is reduced as approaching a package that is overlaid on last one of the predetermined number of packages.

(6) It is preferable that the control unit is configured to output error information when thickness information of the at least one of the packages from the detector exceeds a predetermined value.

In this case, error information can be output based on the thickness information from the detector. Therefore, for example, when thicknesses of the predetermined number of packages are greater than a size of a box into which the packages are to be packed, it is possible to slow down or stop the operation of the case packer. Furthermore, it is possible to inform an operator of the error by the error output.

(7) It is preferable that the case packer further includes a package position changing unit provided on an downstream side of the second conveying unit, and the control unit is configured to control the package position changing unit in accordance with thickness information of the at least one of the packages from the detector.

In this case, even when a thickness of a package is increased or reduced, it is possible to control the package position changing unit by the control unit. Therefore, the position of the package can be varied in a short time period.

According to the case packer of the invention, it is possible to stably convey the packages in a state where they are partially overlaid on one another, and pack the packages in boxes even when the thickness of the packages is varied.

DESCRIPTION OF THE PREFERRED EMBODIMENTS

Hereinafter, embodiments of the present invention will be described with reference to the drawings. In the embodiments, a case packer that overlays packages packaged in flexible thin films on one another will be described based on a specific example. Although the packaged packages in the flexible thin films will be described in the embodiments, however, the present invention can also be applied to any other packages.

First Embodiment

Figure 1:
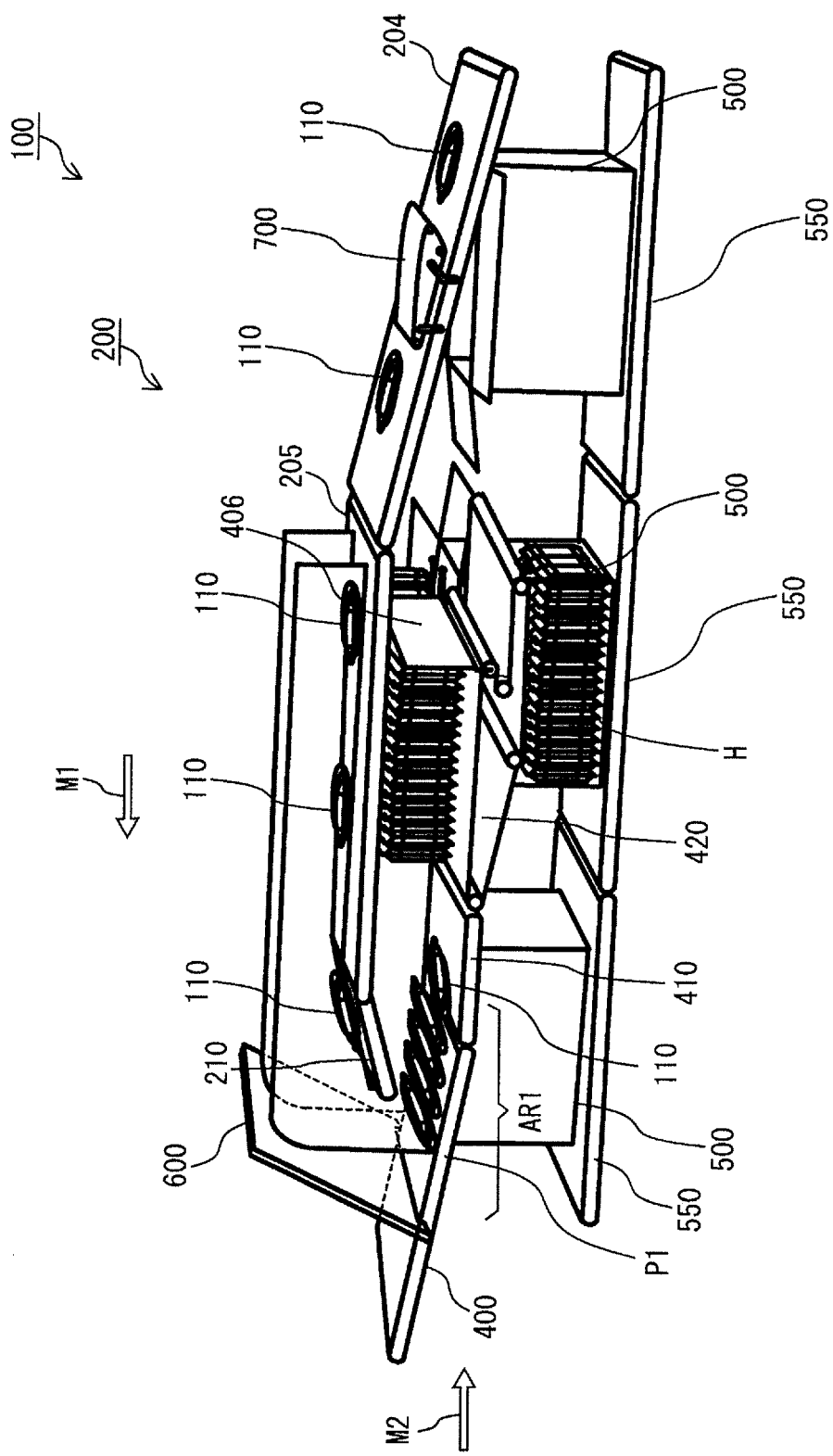
FIG. 1 is a schematic view showing an outward appearance of one example of a case packer according to a first embodiment of the present invention.

FIG. 1 is a schematic view showing an outward appearance of one example of a case packer 100 according to a first embodiment of the present invention.

The case packer 100 shown in FIG. 1 mainly includes a first conveying unit 200, a second conveying unit 400, a third conveying unit 410, an extendable conveying unit 420, a box conveying unit 550, an anti-rotation guide 600, and a seal checker 700.

The first conveying unit 200, the second conveying unit 400, the third conveying unit 410, and the extendable conveying unit 420 have conveying configurations having endless belt conveyers. The extendable conveying unit 420 has an extendable belt conveyer, such as a shuttle conveyer. Details of the extendable conveying unit 420 will be described below.

The first conveying unit 200 conveys the plurality of packages 110 in a direction of an arrow M1. The first conveying unit 200 includes a conveying unit 204, a horizontal portion 205, and a tilt portion 210. The conveying unit 204 has the seal checker 700. The horizontal portion 205 is provided downstream side of the conveying unit 204. The tilt portion 210 is continuously provided downstream side of the horizontal portion 205.

The second conveying unit 400, the third conveying unit 410, and the extendable conveying unit 420 are provided below the first conveying unit 200. The second conveying unit 400, the third conveying unit 410, and the extendable conveying unit 420 convey the plurality of packages 110 in a direction of an arrow M2 that is opposite from the direction of the arrow M1.

As shown in FIG. 1, the packages 110 are conveyed on the conveying unit 204 of the first conveying unit 200, and the seal checker 700 provided on the conveying unit 204 checks whether the package 110 is reliably sealed. In this embodiment, the seal checker 700 detects a thickness of the package 110.

The packages 110 are conveyed on the horizontal portion 205 and then, conveyed on the tilt portion 210, and the plurality of packages 110 are overlaid on one another in an accumulating portion AR1 from a receiving portion P1 of the second conveying unit 400.

Figure 4:
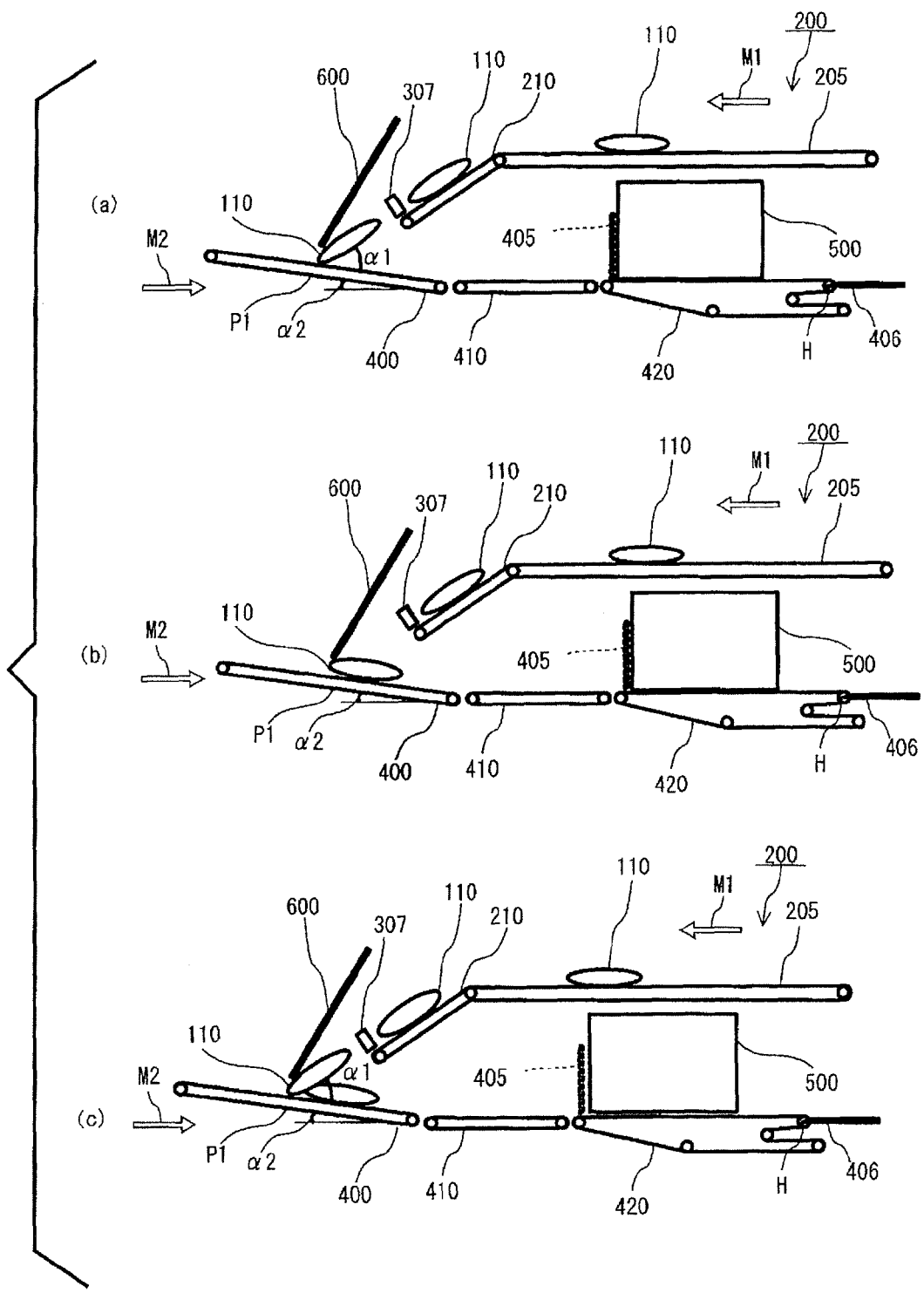
FIG. 4 is a schematic side view for explaining general operations of a first conveying unit, a second conveying unit, a third conveying unit, and a extendable conveying unit of the case packer.

The second conveying unit 400 is tilted at an angle of α2 to a horizontal plane (see FIG. 4). In this case, since the second conveying unit 400 is tilted at the angle of α2, when the predetermined number of packages 110 are conveyed toward the downstream side, even if the conveying speed is abruptly increased, the packages 110 arranged on the downstream side are not flipped over and position thereof are not varied. Therefore, it is possible to stably convey the predetermined number of packages. The second conveying unit 400 includes the receiving portion P1 for receiving packages 110 conveyed from the tilt portion 210 of the first conveying unit 200, and the accumulating portion AR1 where the received package are overlaid on one another by receiving the packages at intervals that are equal to or smaller than a size o the package, and accumulated.

The plurality of packages 110 are arranged from the overlaid state to standing position, and the packages 110 are pushed out in the back direction in FIG. 1. Thereafter, the packages 110 are put into a box 500 from top down. The box 500 is moved by the box conveying unit 550 in a direction of the arrow M2, the box 500 is sealed by a sealing unit (not shown), and the box packing operation is completed.

Although it is not illustrated in FIG. 1, it is preferable to separately provide a unit that spreads corrugated cardboards, seals the same and forms the boxes 500. Although the box 500 is conveyed by the box conveying unit 550, the invention is not limited thereto, and the box 500 may be conveyed by other units in the embodiment. The packages 110 are made to drop from above the box 500, thereby packing the packages 110 in boxes. However, the invention is not limited thereto, a side surface of the box 500 may be opened, and the plurality of packages 110 may be slid into the box.

Figure 2:
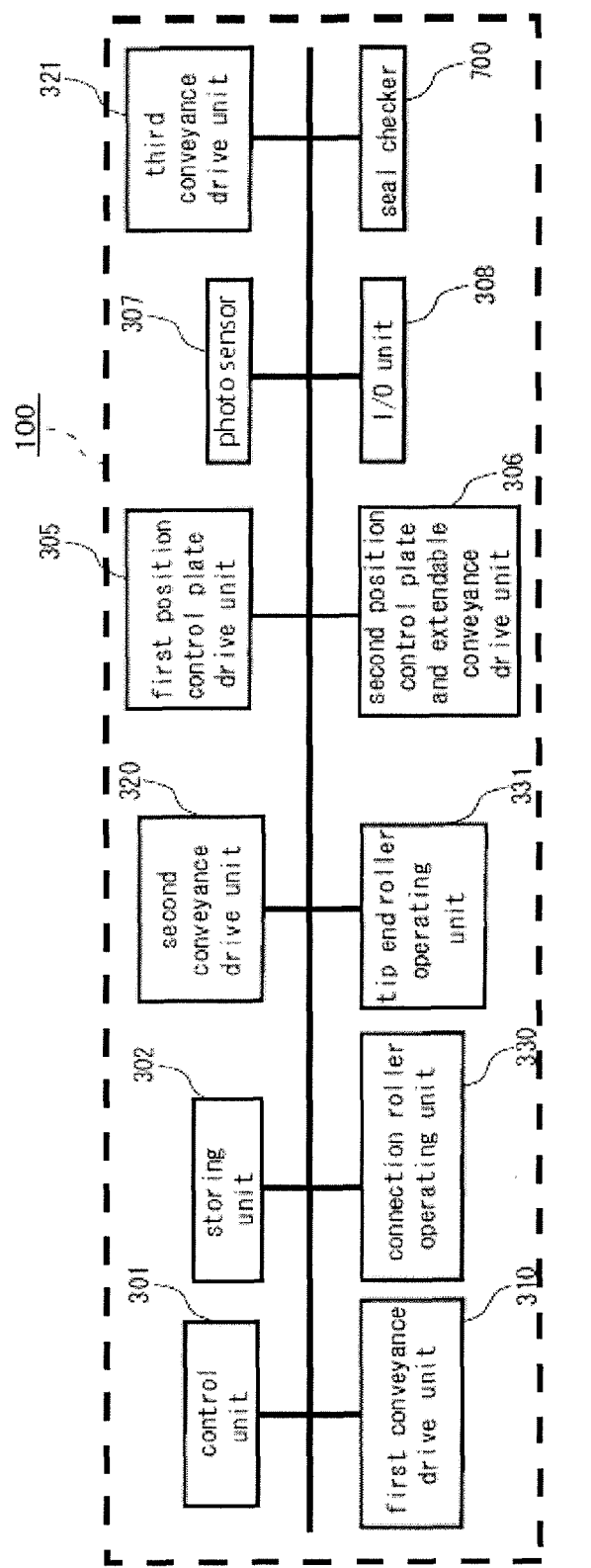
FIG. 2 is a schematic block diagram for explaining an essential configuration of the case packer.

Next, FIG. 2 is a schematic block diagram for explaining an essential configuration of the case packer 100.

As shown in FIG. 2, the case packer 100 includes a control unit 301, a storing unit 302, a first position control plate drive unit 305, a second position control plate and extendable conveyance drive unit 306, a photo sensor 307, the seal checker 700, an I/O unit 308, a first conveyance drive unit 310, a second conveyance drive unit 320, a third conveyance drive unit 321, a connection roller operating unit 330, and a tip end roller operating unit 331. The photo sensor 307 is a detector for detecting the passage of the packages 110.

Based on commodity data of predetermined packages 110 that were input from the I/O unit 308, the control unit 301 selects one of control programs that is appropriate for the commodity data stored in the storing unit 302. When a thickness of a group of packages 110 from the seal checker 700 which will be described below exceeds a size of the box 500, the control unit 301 outputs error information from the I/O unit 308.

The control unit 301 reads the control program stored in the storing unit 302, and controls operations of the first conveyance drive unit 310, the second conveyance drive unit 320, the third conveyance drive unit 321, the first position control plate drive unit 305, and the second position control plate and extendable conveyance drive unit 306 in accordance with information of packages 110 sent from the seal checker 700 and a signal sent from the photo sensor 307.

The first conveyance drive unit 310 controls operations of the horizontal portion 205 and the tilt portion 210. The second conveyance drive unit 320 controls operation of the second conveying unit 400. The third conveyance drive unit 321 controls operation of the third conveying unit 410. The first position control plate drive unit 305 controls operation of a first position control plate 405. The second position control plate and extendable conveyance drive unit 306 controls rotation motion (see FIGS. 6 and 7) of a second position control plate 406, and controls expanding and retracting operation of the extendable conveying unit 420.

The connection roller operating unit 330 can change a distance of the horizontal portion 205 by changing position of rollers between the horizontal portion 205 and the tilt portion 210. The tip end roller operating unit 331 can change the tilt of the tilt portion 210 by changing a position of a tip end roller of the tilt portion 210 of the first conveying unit 200.

Figure 3:
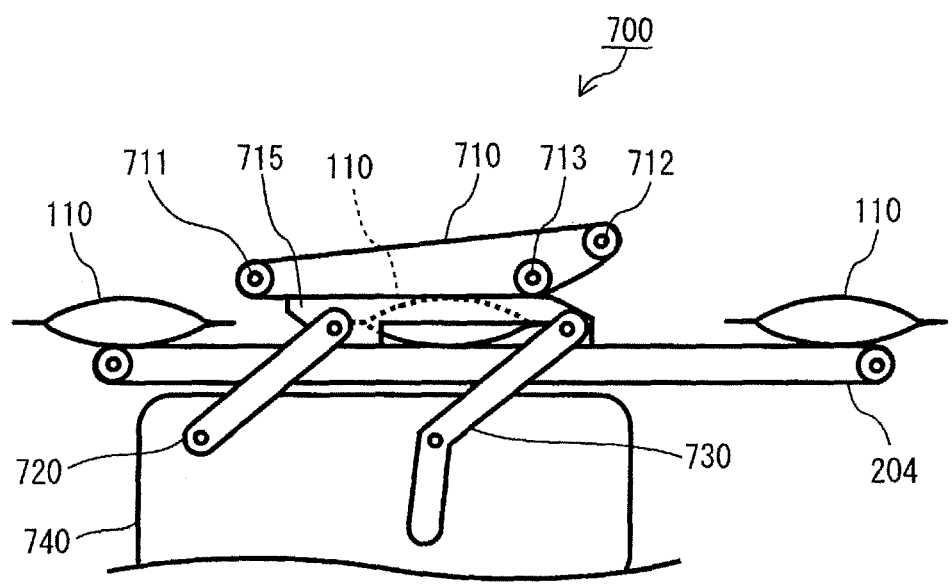
FIG. 3 is a schematic view showing one example of a configuration of a seal checker.

Next, FIG. 3 is a schematic view showing one example of a configuration of the seal checker 700.

As shown in FIG. 3, the seal checker 700 includes a main body 740 having a conveying belt 710, rollers 711, 712, and 713, a first link member 720, a second link member 730 and a motor.

In the seal checker 700, when the packages 110 are conveyed on the conveying unit 204, the roller 711 is rotated by the motor embedded in the main body 740, and the conveying belt 710 moves in a clockwise direction through the rollers 711, 712, and 713.

When the package 110 passes through between the conveying belt 710 and the conveying unit 204, a pressure is applied to the package 110 while rotating the first link member 720 and the second link member 730. The control unit of the main body 740 detects a distance between the conveying unit 204 and the conveying belt 710, and determines the sealing performance of the package 110.

For example, when a thickness of a package 110 is abruptly varied beyond the predetermined range, the control unit 301 determines that the package 110 has a defect. When thickness of a package 110 is varied within the predetermined range, the control unit 301 determines that the package 110 is normal. In this embodiment, thickness information of the package 110 is detected. Note that the thickness information is a numeric value of a thickness of the package 110.

Next, FIGS. 4 to 7 are schematic side views for explaining operations of the first conveying unit 200, the second conveying unit 400, the third conveying unit 410, and the extendable conveying unit 420 of the case packer 100.

As shown in FIG. 4(a), a package 110 is conveyed from the first conveying unit 200 including the conveying unit 204 and the horizontal portion 205 to the receiving portion P1 of the second conveying unit 400. The package 110 is received in the receiving portion P1 at an angle of α1.

Next, as shown in FIG. 4(b), the package 110 falls by its own weight. The control unit 301 controls the driving operation of the second conveying unit 400 based on thickness information of the package 110 sent from the seal checker 700. As a result, the package 110 is conveyed by the second conveying unit 400 in the direction of the arrow M2 by a distance that is shorter than the thickness of the package 110.

Next, as shown in FIG. 4(c), a next package 110 is moved to the receiving portion P1 of the second conveying unit 400 from the first conveying unit 200. The next package 110 is received in the receiving portion P1 at the angle of α1. As shown in FIG. 5(d), the next package 110 is overlaid on the previous package 110 in an out-of alignment manner in the accumulating portion AR1 of the second conveying unit 400.

Next, as shown in FIG. 5(e), a next package 110 is moved to the receiving portion P1 of the second conveying unit 400, the driving operation of the second conveying unit 400 is similarly controlled by the control unit 301 based on thickness information of the package 110 sent from the seal checker 700, and the package 110 is overlaid on the previous package 110 in an out-of alignment manner in the accumulating portion AR1. Next, as shown in FIG. 5(f), a next package 110 is sequentially moved to the receiving portion P1 of the second conveying unit 400, the driving operation of the second conveying unit 400 is similarly controlled by the control unit 301 based on thickness information of the package 110 sent from the seal checker 700, and the package 110 is overlaid on the previous package 110 in an out-of alignment manner in the accumulating portion AR1.

Next, as shown in FIG. 6(g), another package 110 is sequentially moved to the receiving portion P1 and is overlaid on the previous package 110 in an out-of alignment manner in the accumulating portion AR1. The operation is repeated, and speed of the second conveying unit 400 is controlled by the control unit 301 until the predetermined number of packages 110 are overlaid on one another in the accumulating portion AR1 of the second conveying unit 400.

Next, when the predetermined number of packages 110 are moved to the accumulating portion AR1 of the second conveying unit 400 as shown in FIG. 6(h), the speed of each of the second conveying unit 400 and the third conveying unit 410 is increased by the control unit 301, and the predetermined number of packages 110 are conveyed in the direction of the arrow M2. In this case, as shown in FIG. 6(h), all of the predetermined number of packages 110 are placed on the third conveying unit 410, and a next package 110 is moved to the receiving portion P1 of the second conveying unit 400.

Next, a predetermined number of packages 110 are moved from the third conveying unit 410 to the extendable conveying unit 420 as shown in FIG. 6(i). In this case, when the downstream end of the predetermined number of packages 110 is conveyed to the extendable conveying unit 420, the first position control plate 405 is projected over the extendable conveying unit 420 by the control unit 301.

In this case, in the second conveying unit 400, since the plurality of packages 110 are overlaid on one another in an out-of-alignment manner, the second conveying unit 400 is driven little by little by the control unit 301. However, since the second conveying unit 400 and the third conveying unit 410 are independently provided, the third conveying unit 410 can independently be driven. Therefore, the third conveying unit 410 can be used as a buffer, and the plurality of packages 110 can be reserved in the third conveying unit 410 that adjusts the driving time of the first position control plate 405, the second position control plate 406, and a third position control plate 407 described below.

Next, as shown in FIG. 7(j), a shaft H of the extendable conveying unit 420 is moved by the control unit 301 in a direction of an arrow R7 and in this state, the second position control plate 406 rotates and moves in a direction of an arrow R6. In this case, a shaft L of the extendable conveying unit 420 is moved in the direction of the arrow R7.

Consequently, the predetermined numbers of packages 110 are aligned in a standing position as being supported by the second position control plate 406.

Next, as shown in FIG. 7(k), the shaft H of the extendable conveying unit 420 is further moved in the direction of the arrow R7 by the control unit 301, and the second position control plate 406 further rotates and moves in the direction of the arrow R6. In this case, the shaft L of the extendable conveying unit 420 is further moved in the direction of the arrow R7. The predetermined numbers of packages 110 are aligned in a standing position as being supported by the second position control plate 406.

Figure 8:
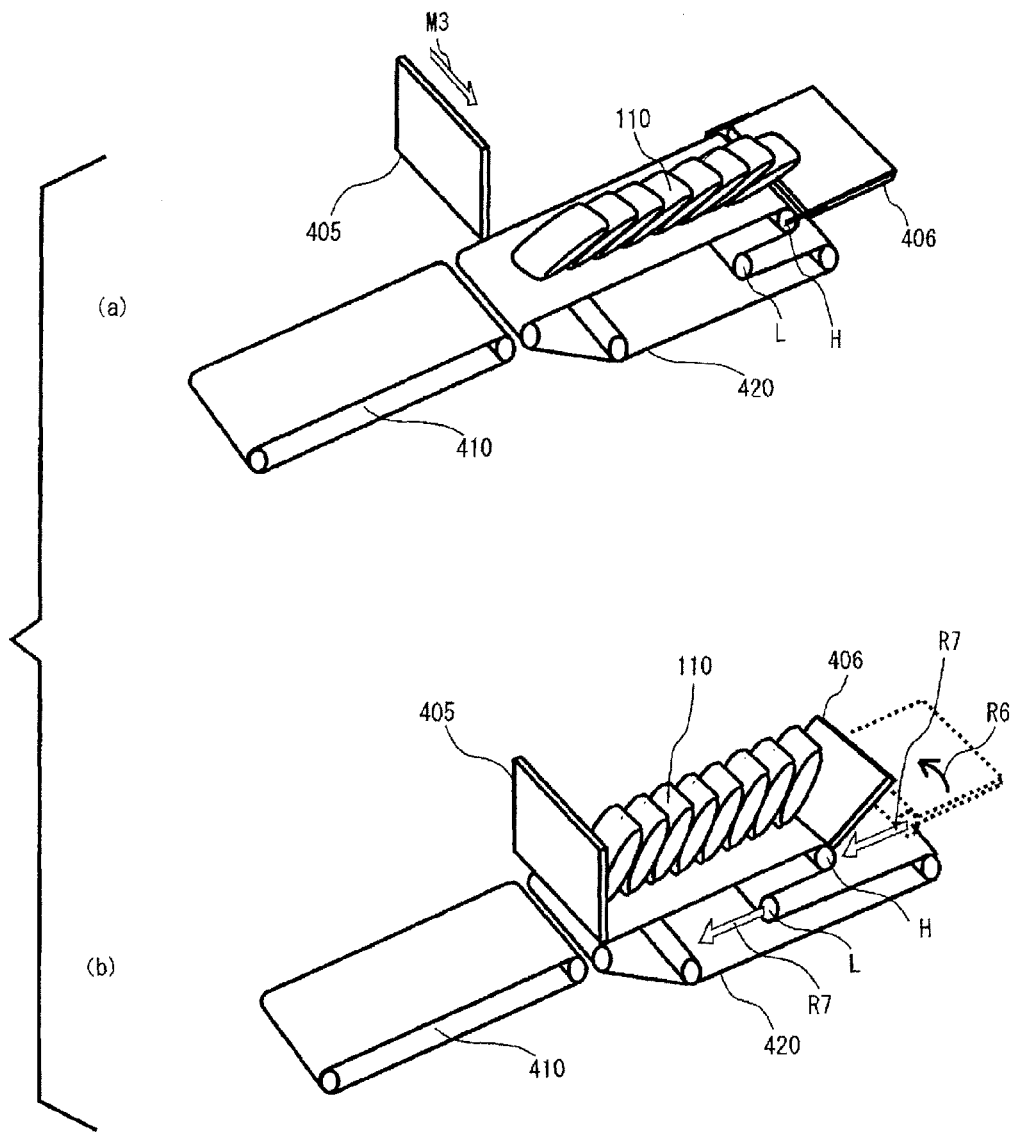
FIG. 8 is a schematic perspective view for explaining, in detail, one example of operations of a first position control plate, a second position control plate and a third position control plate in the extendable conveying unit.
Figure 9:
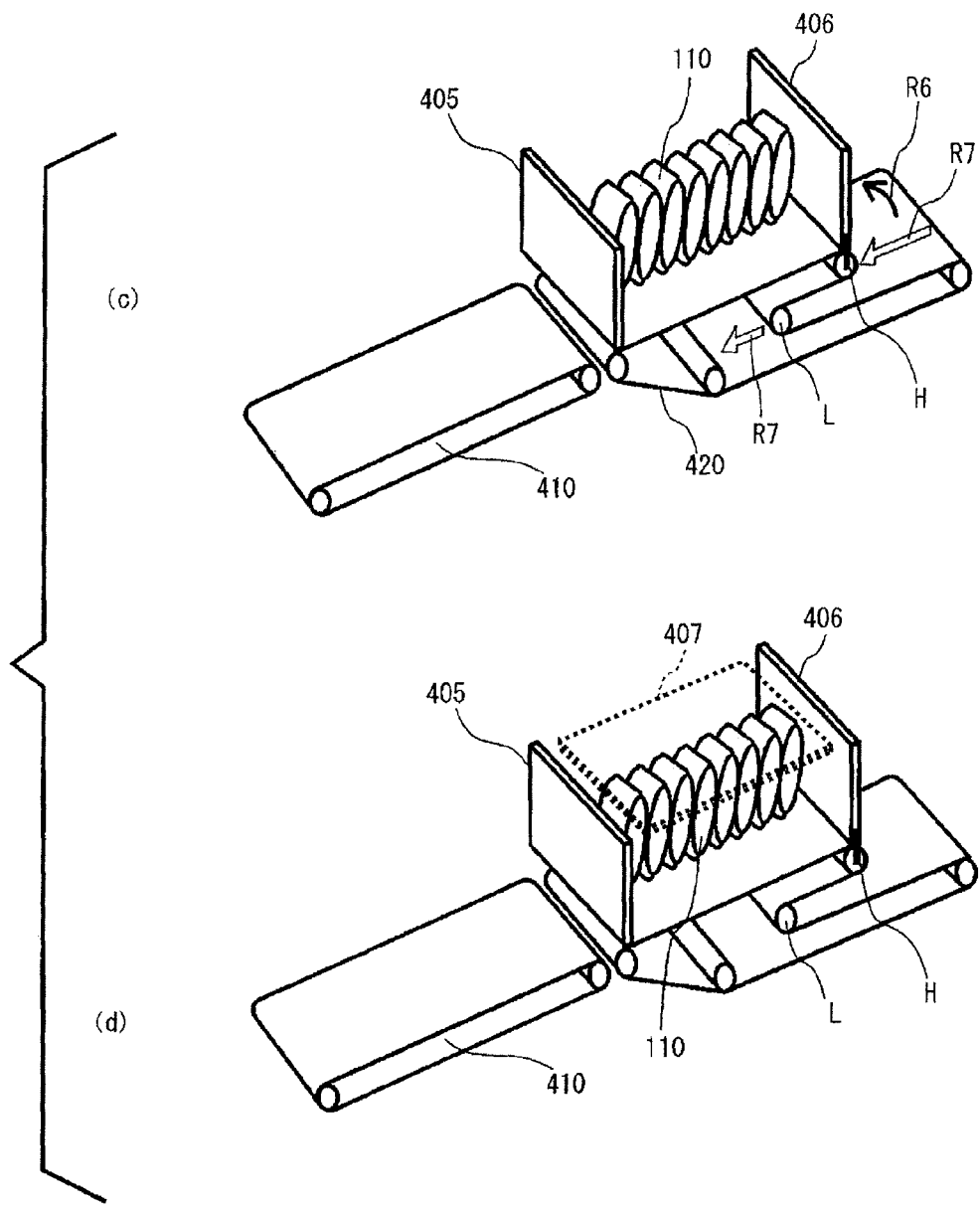
FIG. 9 is a schematic perspective view for explaining, in detail, one example of operations of the first position control plate, the second position control plate and the third position control plates in the extendable conveying unit.
Figure 10:
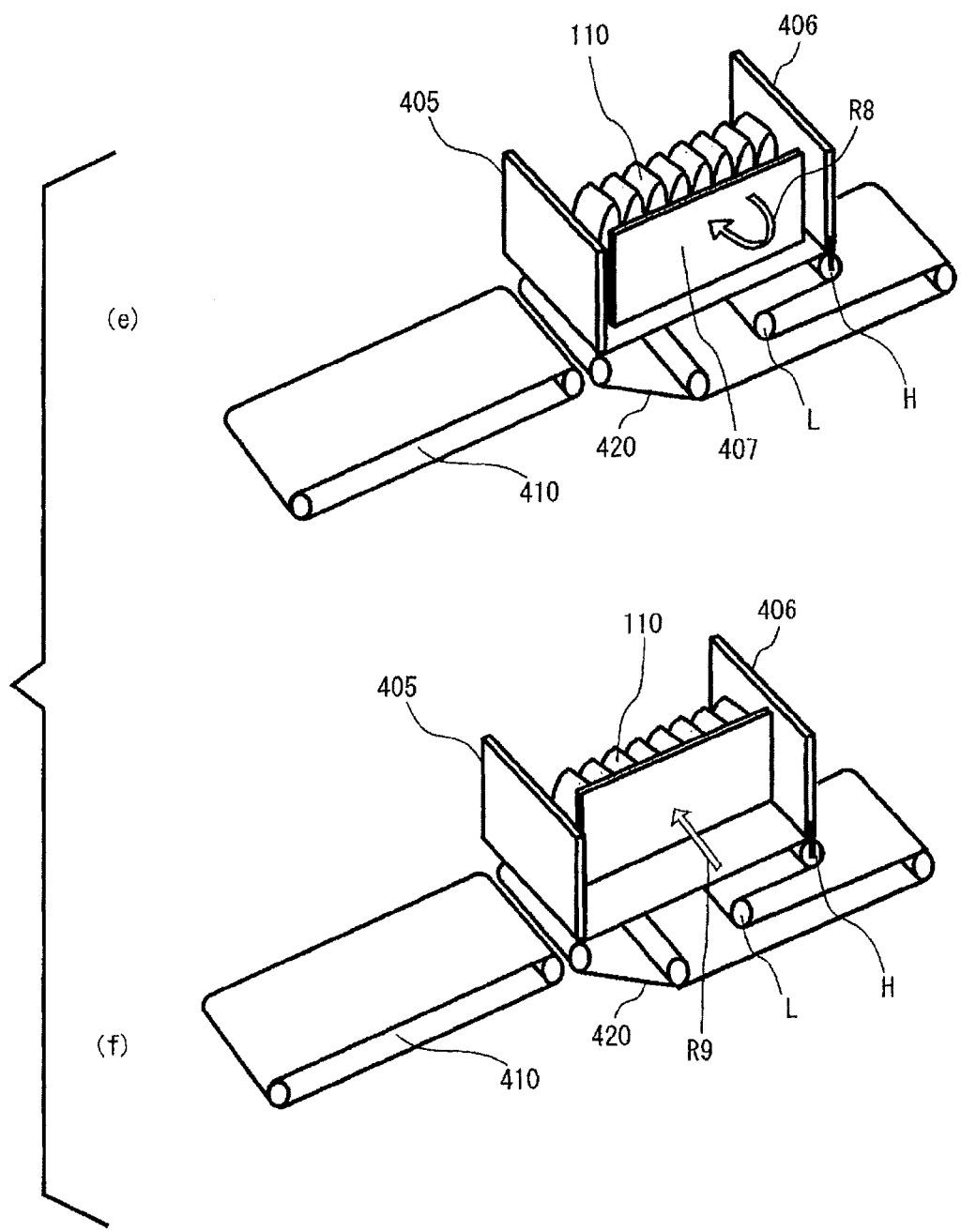
FIG. 10 is a schematic perspective view for explaining, in detail, one example of operations of the first position control plate, the second position control plate and the third position control plates in the extendable conveying unit.

Next, FIGS. 8 to 10 are schematic perspective views for explaining, in detail, one example of operations of the first position control plate 405, the second position control plate 406, and the third position control plate 407 in the extendable conveying unit 420.

As shown in FIG. 8(a), the predetermined number of packages 110 are conveyed to a downstream side of the extendable conveying unit 420. When all of the packages 110 pass the vicinity of the first position control plate 405, the first position control plate 405 is moved in a direction of an arrow M3. As shown in FIG. 8(a), when the predetermined number of packages 110 are conveyed, and about half the packages 110 on the most downstream side are accumulated on the second position control plate 406, the driving operation of the extendable conveying unit 420 is stopped as shown in FIG. 8(b). Thereafter as the rotation shaft H of the second position control plate 406 is moved in the direction of the arrow R7 and in this state, the second position control plate 406 rotates in the direction of the arrow R6. Therefore, the packages 110 can be aligned closer to the standing position in a short time period. By moving the shaft L of the extendable conveying unit 420 in the direction of the arrow R7, the shaft H can absorb looseness of the belt conveyer moved in the direction of the arrow R7.

Next, as shown in FIG. 9(c), the rotation shaft H moves and rotates until the second position control plate 406 enters a standing position. The predetermined number of packages 110 are aligned in a standing position. The second position control plate 406 may be further rotated toward the first position control plate 405 (in the direction of the arrow R6). As a result, the packages 110 can enter the standing position.

As shown in FIG. 9(d), as the third position control plate 407 is disposed above the extendable conveying unit 420.

Next, as shown in FIG. 10(e), the third position control plate 407 rotates in a direction of an arrow R8, and moves to a side of the predetermined number of upright packages 110.

Lastly, as shown in FIG. 10(f), the third position control plate 407 slides in a direction of an arrow R9, the predetermined number of packages 110 are conveyed and put into the box 500 in the standing position.

Figure 11:
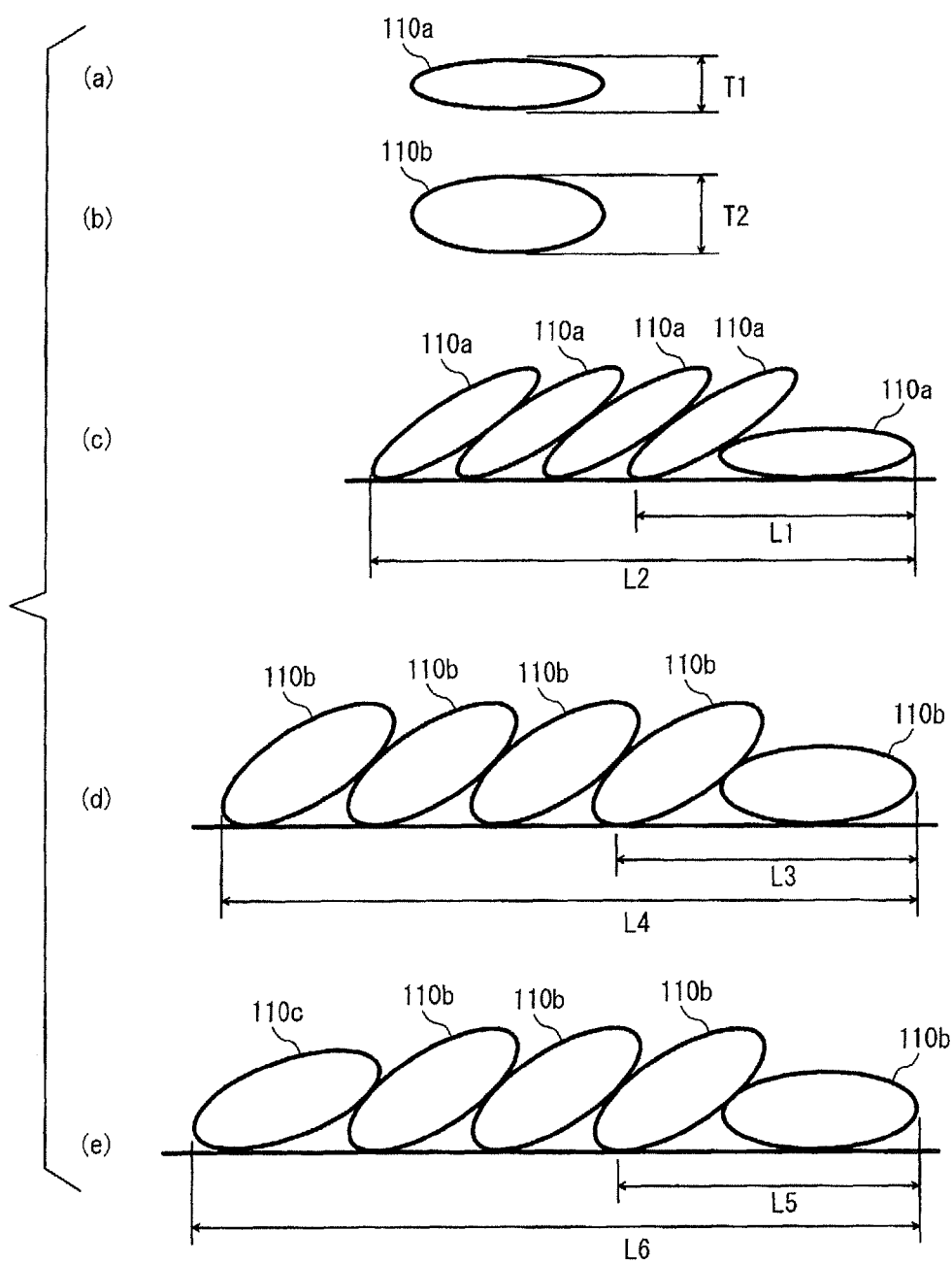
FIG. 11 is a schematic view for explaining variation in thicknesses of packages.

Next, FIG. 11 is a schematic view for explaining variation in thicknesses of the packages 110. FIG. 11(a) shows a case where a thickness of a package 110 is small. FIG. 11(b) shows a case where a thickness of a package 110 is large. FIG. 11(c) shows a case where packages 110 in FIG. 11(a) are overlaid on one another. FIG. 11(d) shows a case where the packages 110 in FIG. 11(b) are overlaid on one another. FIG. 11(e) shows a case where a position of the last one of the packages 110 is changed.

A package 110a shown in FIG. 11(a) and a package 110b shown in FIG. 11(b) are the same package 110. The thickness of the package 110 is varied depending upon temperature, humidity, an amount of air mixed in a package when it is packed, a size of its content, and other conditions or the like when the package is produced.

In this case, the package 110a in FIG. 11(a) has a thickness T1, and the package 110b in FIG. 11(b) has a thickness T2 (T1<T2). The thickness of the package 110 is varied in some cases. In this embodiment, the seal checker 700 detects the thickness T1 of the package 110a and the thickness T2 of the package 110b, and sends the information to the control unit 301. Operation of the control unit 301 will be described below.

When the packages 110a are overlaid on one another as shown in FIG. 11(c), a distance between a leading end of the first package 110a and a next package 110a is L1, and the distance L1 is calculated by the control unit 301 based on thickness information (thickness T1) of the package 110a sent from the seal checker 700. The control unit 301 controls the driving operation of the second conveying unit 400 such that the above-described distance becomes equal to the distance L1.

When packages 110b are overlaid on one another as shown in FIG. 11(d), a distance between a leading end of a leading package 110b and a next package 110b is L3. The distance L3 is calculated by the control unit 301 based on thickness information (thickness T2) of the package 110b sent from the seal checker 700. The control unit 301 controls the driving operation of the second conveying unit 400 such that the above-described distance becomes equal to the distance L3.

With this control, the packages 110 are conveyed such that they are overlaid on one another as shown in FIGS. 4 to 7.

That is, if the control unit 301 does not control the second conveying unit 400, the following cases may occur, that is a case where a next package 110a is not overlaid at all on a package 110a, and a case where a next package 110a excessively overlays on a package 110a. In the case packer 100 of the invention, since the control unit 301 controls the second conveying unit 400 based on the thickness information of the packages 110, 110a and 110b sent from the seal checker 700, it is possible to appropriately overlay the packages 110 on one another.

The control unit 301 may receive thickness information of individual packages 110 and control the second conveying unit 400, or the control unit 301 may control the second conveying unit 400 based on an average value of thicknesses of the plurality of packages 110. If the thickness of the package 110 is within a predetermined range, the second conveying unit 400 may be controlled based on the average value. If the thickness of the package 110 is not within the predetermined range, the second conveying unit 400 may be controlled based on the thickness of the individual packages 110. When the thickness of the package 110 exceeds a predetermined value (when the predetermined number of packages 110 can not be put into the box 500 for example), the I/O unit 308 may output error information, or the case packer 100 may be stopped.

Furthermore, the control unit 301 calculates a distance L2 of the all of the packages 110a as shown in FIG. 11(c) based on thickness information (thickness T1) of the packages 110a sent from the seal checker 700. The control unit 301 drives such that the third conveying unit 410 and the extendable conveying unit 420 based on the distance L2, and an end of the last package 110a is moved to a position overshooting the first position control plate 405.

Similarly, the control unit 301 calculates a distance L4 of all of packages 110b as shown in FIG. 11(d) based on thickness information (thickness T2) of the packages 110b sent from the seal checker 700. The control unit 301 controls such that the third conveying unit 410 and the extendable conveying unit 420 are driven based on the distance L4, and an end of the last package 110b is moved to a position overshooting the first position control plate 405.

With this control, since any of the packages 110a and 110b are conveyed to a position overshooting the first position control plate 405, it is possible to prevent the last package 110a, 110b from being eliminated from a conveyance path by the first position control plate 405.

By controlling the extendable conveying unit 420 based on the distance L2 and the distance L4, the packages 110 can appropriately enter the standing position in a short time period.

Furthermore, as shown in FIG. 11(e), the control unit 301 may change the movement of the second conveying unit 400 so that tilt of only the last package 110c is different from tilts of other packages 110b. As the tilt of only the last package 110c is increased, position of a group of packages 110b, 110c are not disturbed when the packages are conveyed to the third conveying unit 410 and the extendable conveying unit 420 located on downstream side. As a result, the packages 110c are not tipped over.

Although the tilt of only the package 110c is increased in the above explanation, the invention is not limited thereto, and tilts of the packages 110b may be increased little by little from a package 110b that is overlaid on the leading package 110b toward the package 110c.

Figure 5:
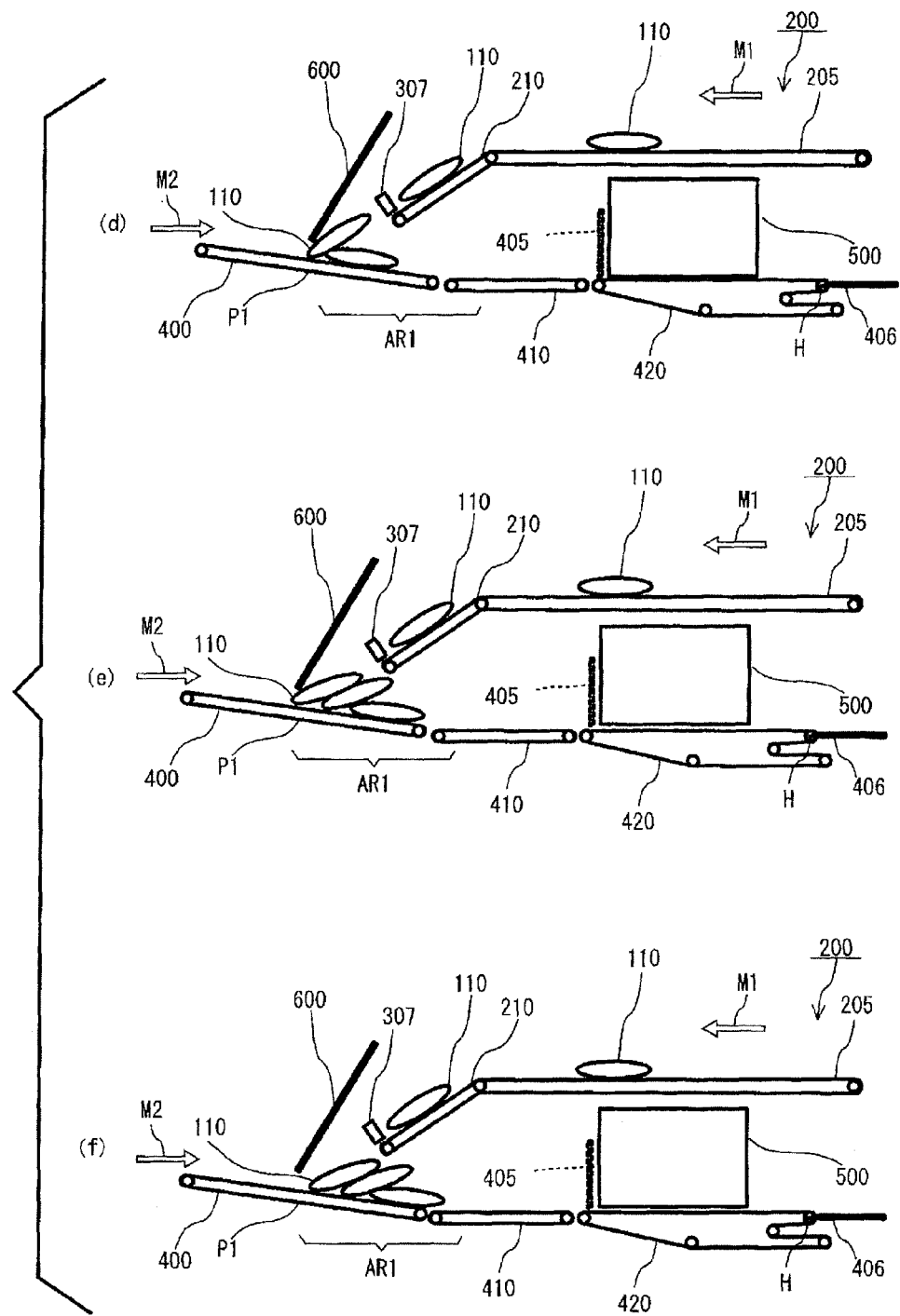
FIG. 5 is a schematic side view for explaining the general operations of the first conveying unit, the second conveying unit, the third conveying unit, and the extendable conveying unit of the case packer.
Figure 6:
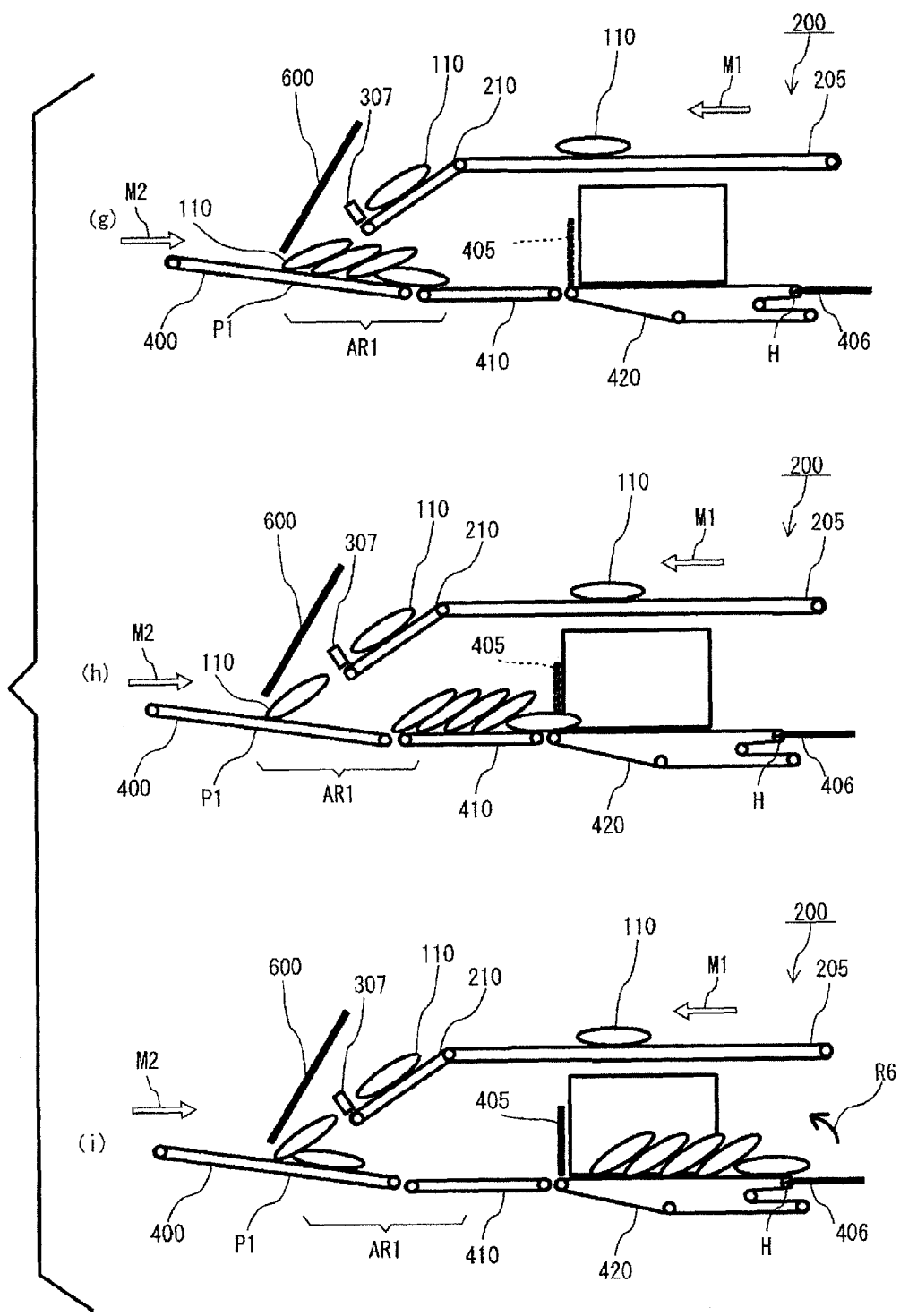
FIG. 6 is a schematic side view for explaining the general operations of the first conveying unit, the second conveying unit, the third conveying unit, and the extendable conveying unit of the case packer.
Figure 7:
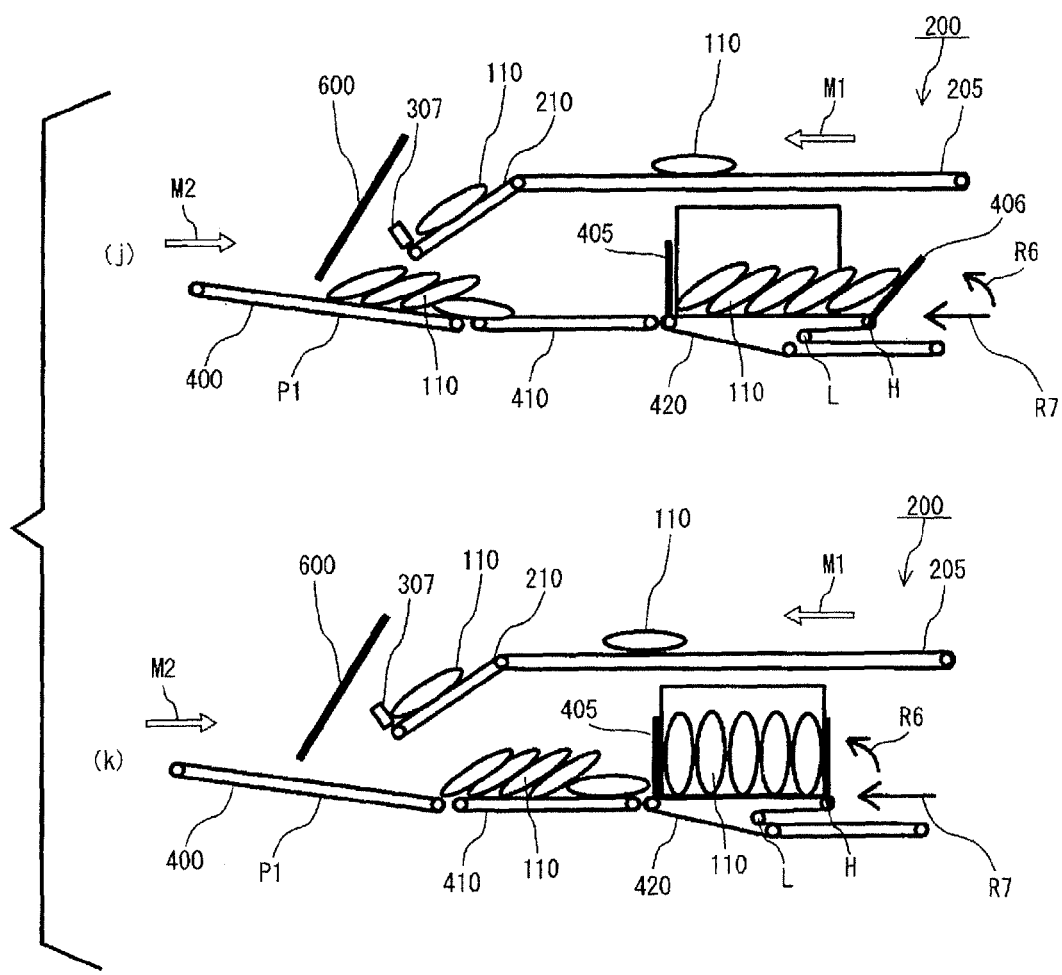
FIG. 7 is a schematic side view for explaining the general operations of the first conveying unit, the second conveying unit, the third conveying unit, and the extendable conveying unit of the case packer.

In FIGS. 4 to 6, the second position control plate 406 enters the horizontal position and the predetermined number of packages 110 are on standby, but the invention is not limited thereto. The packages 110 may be on standby in a state where the second position control plate 406 is slightly rotated in a direction of the arrow R6 from the horizontal state, or in a state where the second position control plate 406 is slightly rotated in a direction opposite from the direction of the arrow R6 from the horizontal state in accordance with thickness information of a package 110 sent from the seal checker 700.

Furthermore, although the seal checker 700 is included in a configuration of the case packer 100, the invention is not limited thereto. The seal checker 700 may be provided outside the case packer 100, and thickness information of the package 110 may be sent to the control unit 301 through the I/O unit 308.

Figure 12:
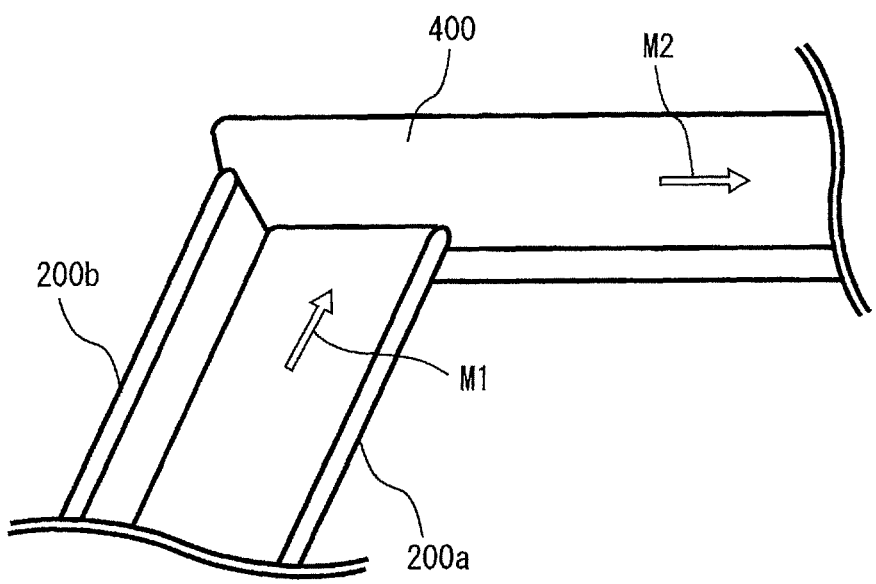
FIG. 12 is a schematic view showing another example of configurations of the first conveying unit and the second conveying unit.

In the above embodiment, the first conveying unit 200 and the second conveying unit 400 extend in the same direction at upper and lower locations, but the invention is not limited thereto, and the first conveying unit 200a and the second conveying unit 400 may intersect with each other as shown in FIG. 12.

More specifically, as shown in FIG. 12, the first conveying unit 200a is provided on a tilt, and a wall 200b that supports the packages 110 is provided on a lower side of the first conveying unit 200a. The packages 110 are conveyed in a direction of the arrow M1, and fall to the second conveying unit 400 from an end of the first conveying unit 200a. The fallen packages 110 are conveyed only by a predetermined distance in the direction of the arrow M2, and a next package 110 falls from the tilted first conveying unit 200a. Therefore, the partially overlaid state of the packages 110 can be formed. In this case also, it is possible to reliably establish the partially overlaid state of a package 110 and a next package 110 by controlling the second conveying unit 400 in accordance with the thickness information of the package 110 sent from the seal checker 700 by the control unit 301.

Another Example

Figure 13:
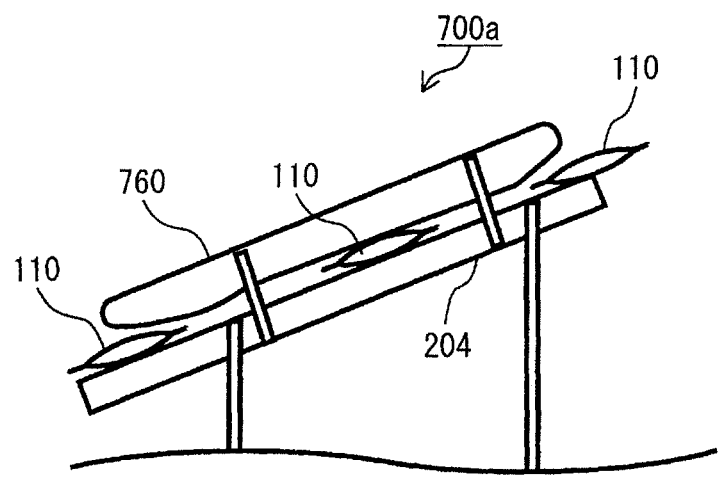
FIG. 13 is a schematic view showing another example of a configuration of the seal checker.

Next, FIG. 13 is a schematic view showing another example of the structure of the seal checker 700.

As shown in FIG. 13, a seal checker 700a comprises a conveying belt 760 and a conveying unit 204.

When the packages 110 are conveyed on the conveying unit 204, the seal checker 700a determines the sealing performance of the packages 110 depending upon whether there is a difference in thickness of the packages 110 on an inlet side and on an outlet side of the conveying belt 760 that has a longitudinal direction.

For example, when thickness difference of the packages 110 is greater than a predetermined range, it is determined that the sealing performance is failed. When the thickness difference of the packages 110 is within the predetermined range, it is determined that the sealing performance is normal.

As described above, a bag of the package 110 expands depending upon humidity, temperature, the packaging condition or the like, the thickness of the package 110 is varied from moment to moment. Therefore, in the case packer 100 of the invention, the second conveying unit 400 is adjusted by the control unit 301 based on the thickness information of a package 110 sent from the seal checker 700. As a result, even if the thickness of the package 110 is varied, it is possible to reliably overlay the packages 110 on one another in the accumulating portion AR1.

Since the thickness of a package 110 is detected using the seal checker 700, it is unnecessary to newly provide a sensor or the like to check the thickness of the package 110. That is, it is possible to reduce the new cost by the seal checker 700 that checks the sealing performance that is required in a preceding process of the packing process of the packages 110 in boxes.

Furthermore, the control unit 301 controls the second conveying unit 400. Therefore, it is possible to reduce an overlaying amount of a package 110c that is to be overlaid on at least last one of the predetermined number of the packages 110 as shown in FIG. 11(e). As a result, even if the packages are conveyed in a state where they are overlaid on one another, it is possible to prevent position of the overlaid packages 110 from being disturbed.

Since the control unit 301 can output error information based on the thickness information sent from the seal checker 700, for example, it is possible to stop the case packer 100 when the thickness of the predetermined number of packages 110 is greater than a size of the box 500. It is also possible to output error information from the I/O unit 308 to inform an operator of the error.

In the invention, the packages 110 correspond to the plurality of packages, and the case packer 100 corresponds to the case packer. The conveying unit 204, the horizontal portion 205, and the tilt portion 210 correspond to a first conveying unit, and the package 110c corresponds to a package that is overlaid lastly. The third conveying unit 410, the extendable conveying unit 420, the first position control plate 405, and the second position control plate 406 correspond to a package position changing unit, and thicknesses T1 and T2 correspond to the thicknesses of packages. The seal checker 700 and 700a corresponds to a detector, and the accumulating portion AR1 corresponds to an accumulating portion. The second conveying unit 400 corresponds to a second conveying unit, and the control unit 301 corresponds to a control unit.

The preferred embodiment of the invention is as described above, but the invention is not limited only to the embodiment. It will be appreciated that various embodiments can be made without departing from the sprit and scope of the invention. In the embodiment, although advantages and effects generated by the configuration of the invention have been described, these advantages and effects are only one example, and the invention is not limited.

What is claimed is:

1. A case packer comprising:
a first conveying belt conveying a plurality of packages in a first conveying direction, with each of the plurality of packages having an amount of air inside, and an overall thickness of each of the plurality of packages being inconsistent with respect to one another;
a detector including a second conveying belt, the detector detecting the overall thickness of at least one of the plurality of packages with the at least one of the plurality of packages being sandwiched between the first conveying belt and the second conveying belt;
a second conveying unit including an accumulating portion positioning the packages such that the at least one of the packages partially overlays an adjacent one of the packages, and positioning subsequent ones of the plurality of packages partially overlaying the subsequent ones of the plurality of packages overlaying adjacent ones of the packages, the second conveying unit conveying the packages overlaid in the accumulating portion to a boxing unit that boxes a sub-set of the plurality of packages; and
a control unit adjusting operation of the second conveying unit based on a detected value from the detector.

2. The case packer according to claim 1, wherein the detected value from the detector provided to the control unit is thickness information detected from the at least one of the plurality of the packages.

3. The case packer according to claim 1, wherein the detector includes a seal checker that determines the reliability of seals of the at least one of the plurality of packages.

4. The case packer according to claim 1, wherein the detector detects thickness information for each of the plurality of packages, and
the control unit controls operation of the second conveying unit based on thickness information of each of the plurality of the packages.

5. The case packer according to claim 1, wherein the control unit controls the second conveying unit such that a group of a predetermined number of the packages are overlaid on one another, and such that an overlaying amount of a package that is to be overlaid on at least a last one of the packages in the group is adjusted.

6. The case packer according to claim 1, wherein the control outputs error information when thickness information of the at least one of the packages from the detector exceeds a predetermined value.

7. The case packer according to claim 1, further comprising a package position changing unit provided on a downstream side of the second conveying unit, and wherein the control unit controls the package position changing unit in accordance with thickness information of the at least one of the packages from the detector.

8. The case packer according to claim 1, wherein the first conveying belt moves the plurality of packages in a horizontal direction, and
the second conveying belt of the detector is positioned above the first conveying belt such that each of the plurality of packages is conveyed above the first conveying belt and below the second conveying belt.

9. The case packer according to claim 8, wherein the detector is movable relative to the first conveying belt such that a distance between the second conveying belt and the first conveying belt is changeable.

10. The case packer according to claim 9, wherein the control unit adjusts the position of the second conveying belt changing the distance between the second conveying belt and the first conveying belt pressing the one of the plurality of packages between the first conveying belt and the second conveying belt providing an indication of the thickness of the one of the plurality of packages located between the first conveying belt and the second conveying belt.

11. The case packer according to claim 1, wherein the detector is movable relative to the first conveying belt such that a distance between the second conveying belt and the first conveying belt is changeable.

12. The case packer according to claim 11, wherein the control unit adjusts the position of the second conveying belt changing the distance between the second conveying belt and the first conveying belt pressing the one of the plurality of packages between the first conveying belt and the second conveying belt providing an indication of the thickness of the one of the plurality of packages located between the first conveying belt and the second conveying belt.

* * * * *